United States Patent
Cohen

(10) Patent No.: US 10,731,324 B2
(45) Date of Patent: Aug. 4, 2020

(54) HYDRANT ARMOR

(71) Applicant: James D. Cohen, Wanaque, NJ (US)

(72) Inventor: James D. Cohen, Wanaque, NJ (US)

( * ) Notice: Subject to any disclaimer, the term of this patent is extended or adjusted under 35 U.S.C. 154(b) by 124 days.

(21) Appl. No.: 16/111,911

(22) Filed: Aug. 24, 2018

(65) Prior Publication Data

US 2020/0063405 A1 Feb. 27, 2020

(51) Int. Cl.
*E03B 9/06* (2006.01)

(52) U.S. Cl.
CPC ...................... *E03B 9/06* (2013.01)

(58) Field of Classification Search
CPC .............. E03B 9/06; E03B 9/10; F16K 27/12
USPC ........................................ 137/296, 294, 295
See application file for complete search history.

(56) References Cited

U.S. PATENT DOCUMENTS

| | | | | |
|---|---|---|---|---|
| 565,013 A * | 8/1896 | Moodie | ................ | B01L 3/5025 137/297 |
| 1,105,040 A * | 7/1914 | Paulus | ................ | B01L 3/5025 137/297 |
| 4,556,080 A * | 12/1985 | Picaud | ................ | E03B 9/06 137/296 |
| 4,736,765 A * | 4/1988 | Campbell | ................ | E03B 9/06 137/296 |
| 5,664,597 A * | 9/1997 | Miskiewicz | .............. | E03B 9/06 137/15.02 |
| 6,474,358 B1 * | 11/2002 | Malkvist | ................ | E03B 9/06 137/296 |
| 6,536,462 B1 * | 3/2003 | Laugen | ................ | E03B 9/06 137/15.17 |
| 6,935,360 B2 * | 8/2005 | Knappmiller | ........... | F16K 27/12 137/296 |

* cited by examiner

*Primary Examiner* — Justin M Jonaitis

(57) ABSTRACT

HYDRANT ARMOR is an enclosure that protects fire hydrants from all weather and environmental conditions and has light reflective features incorporated on the exterior of the enclosure to ensure its visibility in darkness. When fitted with a tall reflective post, fire hydrants can be located even when they are covered in snow. Hydrant valves and hose connection caps are protected from natural elements and corrosion while they are within the hollow enclosure. The enclosure is suspended off the ground so as not to become frozen to the ground, and is held in place with an integral bracket that is attached to the hydrant. The open bottom of the enclosure fits over and locks onto the bracket and can be removed from the hydrant without tools. The conical shape of the enclosure, tapered at the bottom, will prevent the enclosure from binding in deep snow.

11 Claims, 4 Drawing Sheets

HYDRANT ARMOR

HYDRANT ARMOR is an enclosure that protects fire hydrants from all weather conditions and has light reflective features incorporated on the exterior of the enclosure to ensure its visibility in darkness. When fitted with a tall reflective post, hydrants can be located even when they are covered in snow. Hydrant valves and hose connection caps are protected from natural elements and corrosion while they are within the hollow enclosure. The enclosure is suspended off the ground so as not to become frozen to the ground, and is held in place with an integral bracket that is attached to the hydrant. The open bottom of the enclosure fits over and locks onto the bracket and can be removed from the hydrant without tools. The conical shape of the enclosure, tapered at the bottom, will prevent the enclosure from binding in deep snow. Hydrants enclosed with Hydrant Armor will require less maintenance as they will not be exposed to natural corrosive elements. Firefighters will always have immediate access to fire hydrants that are protected with the Hydrant Armor enclosure.

U.S. Patents that may claim some comparison but are dissimilar:

The cited enclosures are different in that tools are required to be used to release the enclosures to access the fire hydrants, and that the enclosures are either fixed to the ground or sit on the ground thus becoming frozen to the ground during thaw and refreeze climate changes. Further, most of the cited enclosures can become vacuum locked in the frozen space around the enclosures without having air vents making the hydrants unusable. Uncovering fire hydrants during or after a snow event to gain access to water would be time consuming. The Hydrant Armor enclosure does not require tools to release the enclosures, is suspended off the ground so it cannot become frozen to the ground, is vented so as not to become air-locked in deep snow, and is inversely tapered having a smaller bottom diameter than the top diameter so that the enclosure cannot become bound in the snow. None of the cited enclosures have been successfully marketed or sold because of their shortcomings. The Knappmiller and Laugen patents have expired and unless renewed, the other cited patents (may) have also expired.

I respectfully declare and attest that the basis of my invention was fully thought of, designed and created by me without any knowledge of the cited enclosures. I only learned about Knappmiller and Laugen when I applied for my patent. My search for current market hydrant enclosures revealed nothing (thus suggesting that none of the cited enclosures are being marketed). Fire fighters have not had a product that could solve their problem of accessing water when fire hydrants are (externally) frozen or buried in snow. Unfortunately, too much time is spent locating, then digging out hydrants while fires accelerate.

585013, 08-1896, Moodie; (Addressing examiner's pages 5,6,&7). Moodie's enclosure has a smaller top diameter than the bottom diameter, is double-walled, and is set on a bracket that is permanently attached to the ground. In this invention, the enclosure would be bolted to the bracket rendering the enclosed hydrant useless until the snow and ice could be cleared from the base. Further, the geometry of the smaller diameter top and larger diameter bottom of the enclosure would also render the hydrant inoperable since, as snow falls and becomes packed around the base, and then gets further packed in smaller diameters as snow accumulates upwards, the enclosure would not be able to be lifted until the snow is removed from the entire enclosure.

It appears that the bracket is fabricated on site and is not necessarily adjustable ("a separate base (is) adapted"). The enclosure is made of cast iron making it too heavy to be lifted, especially when encased in snow or ice.

The purpose of Moodie's 1896 enclosure was to prevent water in fire hydrants from freezing (as he addresses airtightness, felt linings and rubber gaskets). Todays fire hydrants are dry and do not contain water until the valve is opened. The Hydrant Armor enclosure is designed to have quick access to fire hydrants after snow and/or ice accumulations. The hollow cavity of the enclosure ensures that the valves and caps are always clear. Also, the Hydrant Armor enclosure cannot become bound in snow or ice as it is suspended off the ground, is inversely tapered and is light weight (about 6 pounds). One firefighter could alone remove the enclosure, without tools, in seconds.

5664597-A, 09-1997, Miskiewicz: (addressing examiner's page 8). Miskiewicz makes a cylinder by bending flat rectangular material into a sidewall then caps the cylinder with a separate dome to form the enclosure. Further, Miskiewicz's FIG. 1, #24, and column 4, line 6, shows and describes a lip at the bottom of the sidewall that would be set on the ground, then utilizes a strap to "hold" the enclosure to a fire hydrant to keep the enclosure pressed to the ground. The Hydrant Armor enclosure, and the method of attaching the Hydrant Armor enclosure to a fire hydrant utilizing an integral bracket is obviously different than Miskiewicz's "sum of the parts" enclosure. Miskiewicz's enclosure sits on the ground and will become frozen to the ground as I described in Moodie's design, while the Hydrant Armor enclosure is suspended off the ground and cannot become frozen to the ground. Further, if the snow is deep, Miskiewicz's design actually traps the enclosure in the snow while the Hydrant Armor tapered design actually, albeit slightly, forces the enclosure upward and out of snow packed around the enclosure. Miskiewicz uses a strap to hold his enclosure on a fire hydrant and does not use Hydrant Armor's integral bracket. Miskiewicz's enclosure does not appear to be able to withstand wind or snow loads and is designed to be collapsible (Miskiewicz column 1, line 67). One can imagine that, with a heavy, wet snowfall, Miskiewicz's enclosure would "implode" leaving a firefighter unable to even find and clear the hydrant while a fire accelerates. Hydrant Armor's enclosure is rigid and uses an integral bracket to attach the enclosure to a fire hydrant.

There is no confusion that the Hydrant Armor enclosure and the Miskiewicz enclosure have any similarities. The way they're installed, the way they function and even their silhouettes differ substantially.

The enclosures within the patents: 1105040-A, 07-1914, Paulis4556080-A, 12-1985, Picaud4736765-A, 04-1988, Campbell, and 6474358-A, 11-2002, Malkvist differ from Hydrant Armor's enclosure for the previously mentioned reasons.

6,935,360 Filed Aug. 30, 2005, expired Oct. 17, 2017. Knappmiller, FIRE HYDRANT PROTECTIVE COVER AND VISIBILITY MARKER is a mushroom shaped cover. There is no apparent method of connecting this cover to a hydrant. This cover sits directly on the ground so it has the potential for it to become frozen to the ground thereby rendering the enclosed hydrant inaccessible and therefore inoperable. And with its 5 foot height and 5 foot width at the top, it is unstable and prone to fall absent of any method to hold it in place. The inventor suggests using a chain connection to prevent theft but fails to describe how to connect a chain.

6,536,462 Filed Mar. 25, 2003, expired May 12, 2015. Laugen, FIRE HYDRANT COVER. Its tent like design has a wide bottom and narrow top. Any amount of snow will "anchor" this cover to the ground rendering the enclosed hydrant inaccessible and therefore inoperable as snow will accumulate at increasing rates along the diminishing upward width of the cover. The time required to remove snow and ice from this cover to gain access to the hydrant would potentially exceed the time it would take to clear snow and ice from an unprotected hydrant. Additionally, the described method of attaching this cover to the hydrant at ground level could make the cover's removal even harder and more time consuming especially after a freeze-thaw-refreeze cycle.

Figure 1:
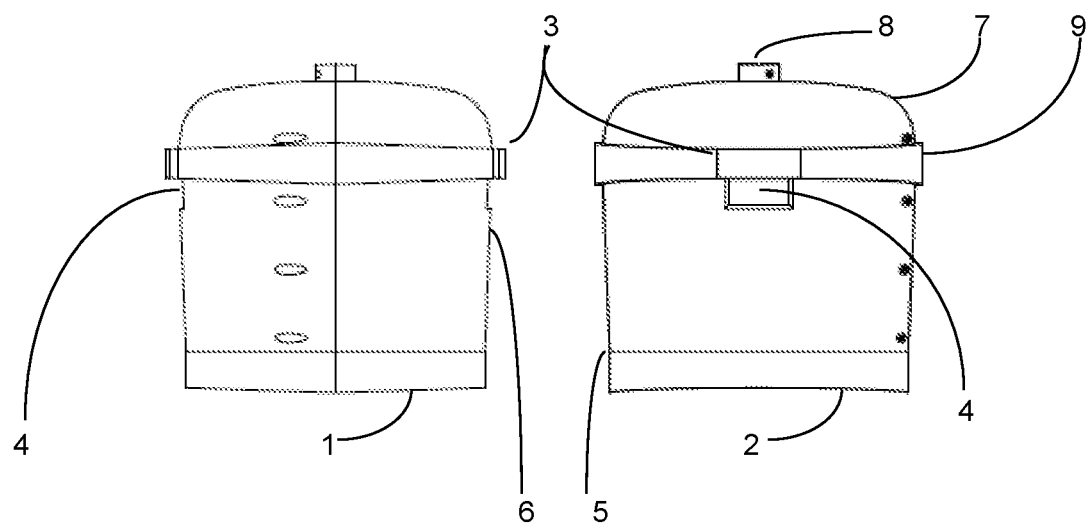
FIG. 1—Profiles of the hydrant enclosure at right angles to each other: Profile 1 shows the enclosure handles 3 at a side view. Profile 2 shows a handle 3 along its horizontal grip. Air vents 4 are located under the handles 3. The diameter at the bottom 5 is smaller than the diameter at the top 6 of the conical cylinder. The dome 7 is curved with a cap 8 at the center. A reflective post (not shown) may be attached to the cap 8. The conical cylinder (at) 6 and the dome 7 are separated from each other with a band 9 which incorporates the handles 3 and air vents 4.
Figure 2:
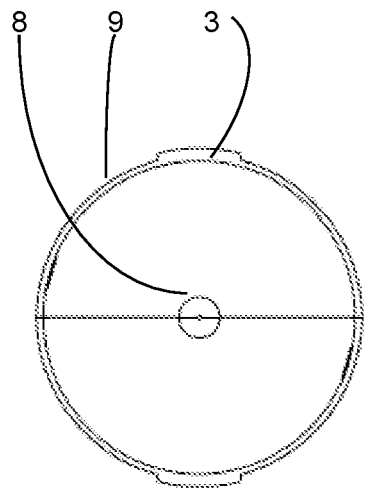
FIG. 2—A top view of the hydrant enclosure: The cap 8 is in the center and has a hole to install a reflective post. The outside circumference of the band 9 incorporates the handles 3.
Figure 3:
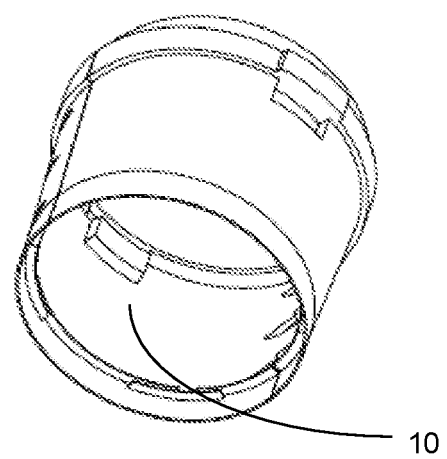
FIG. 3—A view of the underside of the hydrant enclosure: Here, the opening 10 is shown where the enclosure fits over a fire hydrant and connects to a bracket (described in FIG. 4) that is attached to the fire hydrant.
Figure 4:
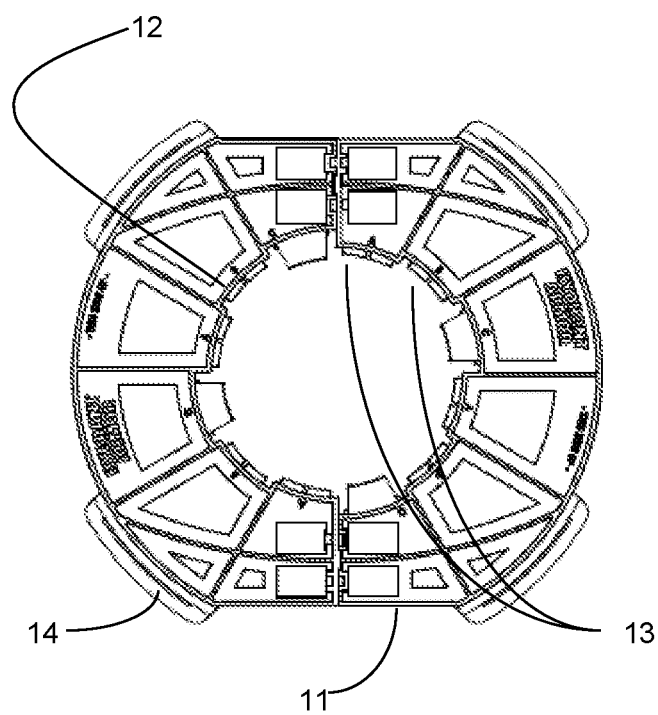
FIG. 4—A top view of the bracket: The bracket 11 is attached to a fire hydrant along the bracket's inner circumference 12 and fits to the outer circumference of the barrel of a fire hydrant. The bracket 11 has various positions 13 along its inner circumference to allow for varying diameter sizes of fire hydrant barrels when used in conjunction with movable tabs (described in FIG. 6).
Figure 5:
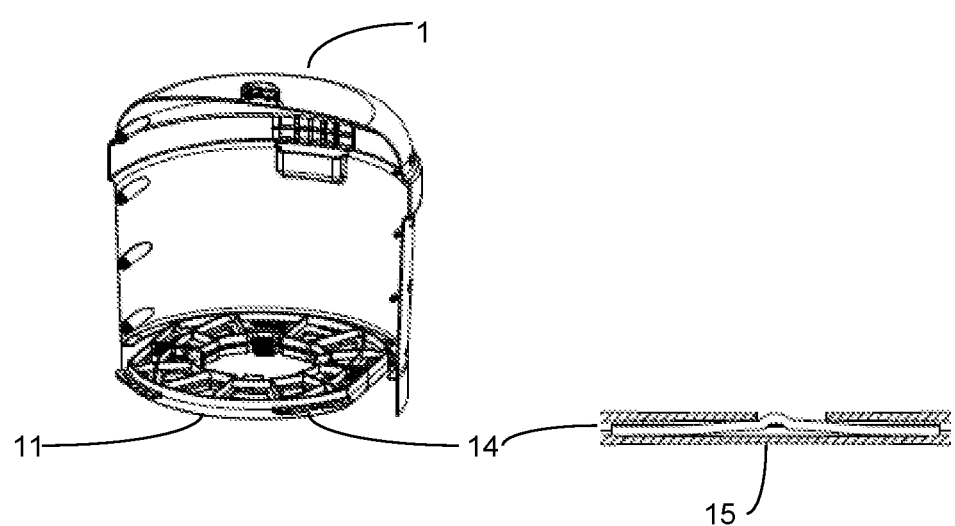
FIG. 5—A perspective view of the bracket in position in the enclosure: The bracket 11 incorporates tongues 14 located around its outer circumference. The tongues 14, inclusive of built-in retaining locks 15, slide into channels located inside of the enclosure (described in FIG. 7) to hold and lock the hydrant enclosure 1 in place on the hydrant.
Figure 6:
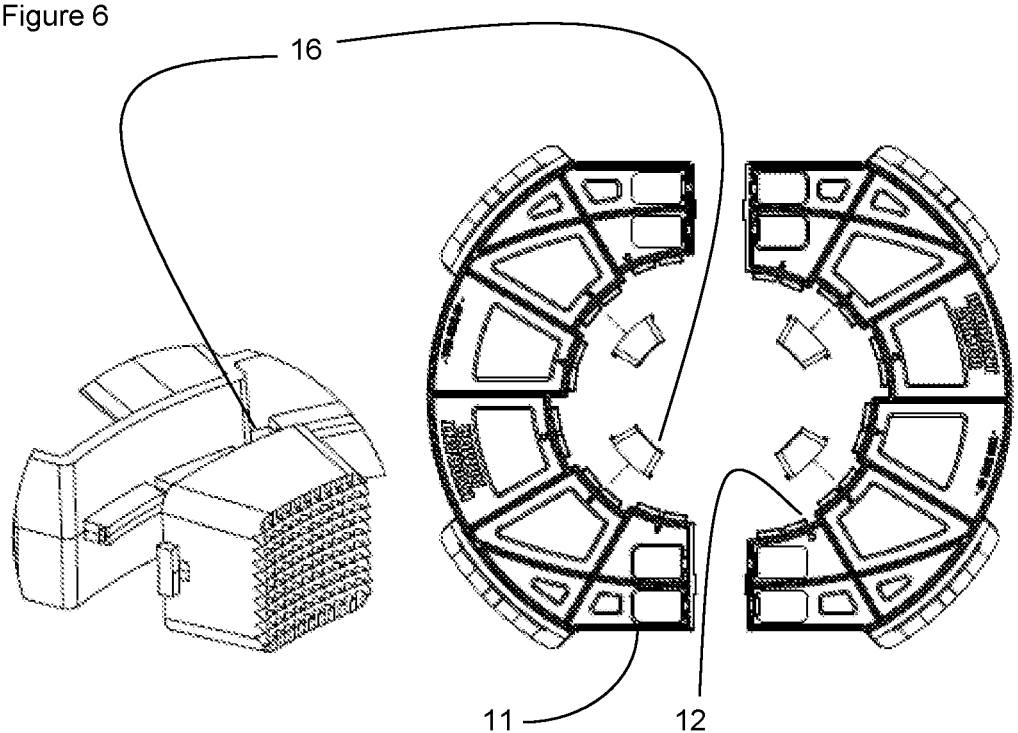
FIG. 6—Tabs: Tabs 16 are set along the inner circumference 12 of the bracket 11 to securely grip the bracket 11 to a hydrant.
Figure 7:
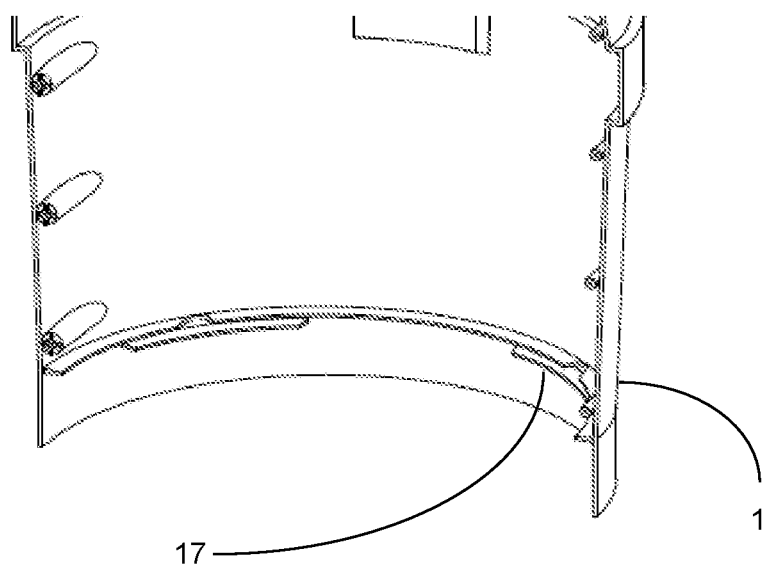
FIG. 7—Cross section of lower part of the enclosure: Channels 17 are employed to accept the tongues 14 of the bracket 11.
Figure 8:
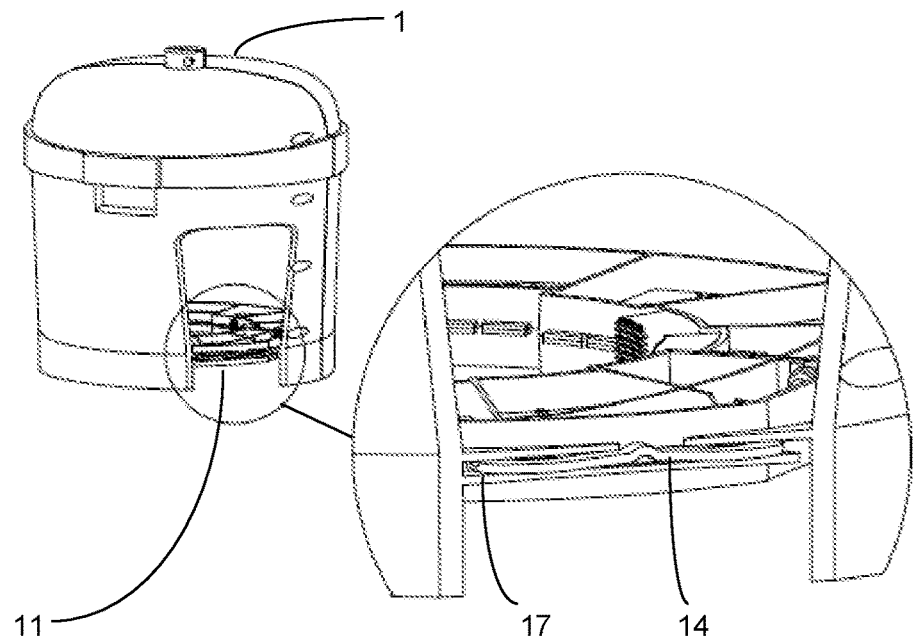
FIG. 8—Cut-a-way and close-up integration of the bracket and enclosure: This view shows the hydrant enclosure 1 attached to the bracket 11, with the tongue 14 of the bracket 11 inside the channel 17 on the interior of the hydrant enclosure 1.
Figure 9:
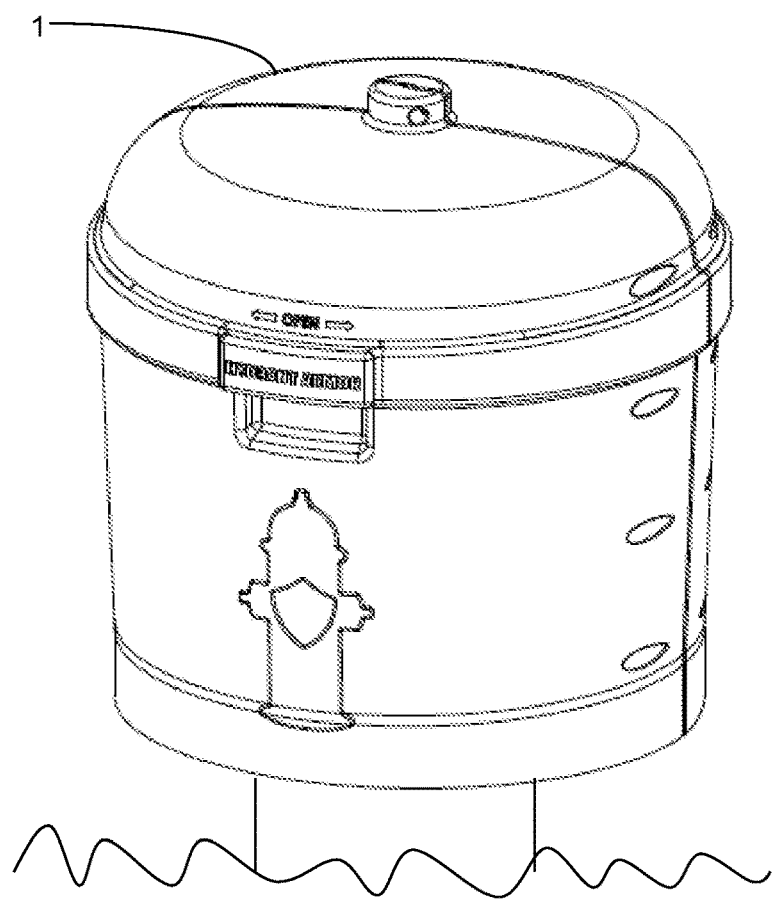
FIG. 9—The installed hydrant enclosure: This view illustrates that the installed enclosure 1 completely encapsulates the hydrant's valves and hose connection caps and further illustrates that the hydrant enclosure is suspended off the ground.

I claim:
1. An enclosure for protecting a valve and a plurality of hose connection caps of a fire hydrant from weather conditions by encapsulating the valves and the hose connection caps, with the enclosure comprising of:
 a hollow body defining an interior space:
  wherein said hollow body has a conical shape with a bottom diameter that is smaller than a top diameter, when installed on the fire hydrant, such that the tapered conical shape prevents the hollow body from binding or becoming frozen to the ground when exposed to heavy snow or ice;
  said hollow body including vents on a sidewall to prevent vacuum air locks or suction during a process of removing the hollow body from the fire hydrant, and;
 a bracket, separate from the hollow body but integral to the hollow body, that, when installed on a fire hydrant, attaches to, and maintains the hollow body in place on the fire hydrant.
2. The enclosure of claim 1, further comprising of light reflective features incorporated onto an exterior of the hollow body to make the hydrant's location visible in darkness.
3. The enclosure of claim 1 further comprising of a clamp, integral and molded into an external wall of the hollow body to affix a reflective post to the hollow body so that a hydrant can be located even when the enclosed hydrant is fully covered in deep snow.
4. The enclosure of claim 1 wherein the bracket further comprises a plurality of removable tabs to attach the bracket to a fire hydrant by way of adjusting an inner diameter of the bracket by setting the tabs into various radius depths within the inner diameter of the bracket so that the bracket will fit a variety of different sized hydrants.
5. The enclosure of claim 1 comprising at least one tongue and channel geometric to join the hollow body to the bracket at an open bottom of the hollow body allowing the hollow body to be secured to the fire hydrant.
6. The enclosure of claim 1 comprising at least one tongue and channel geometric to provide a method to quickly and easily detach the hollow body from the bracket so the hollow body may be removed from the fire hydrant for firefighting or for maintenance by utilizing a simple motion to disengage the hollow body from the bracket without the use of tools.
7. The enclosure of claim 1 further comprising when the hollow body is installed on the fire hydrant, the hollow body is suspended off the ground so as not to become frozen to the ground during a refreezing of melted snow, or as a result of an ice coating during an ice storm.
8. The enclosure of claim 1 further comprising of built-in handles to accommodate hand gripping for attaching and removing the enclosure.
9. The enclosure of claim 1 further comprising a buffer around a hard surface of a fire hydrant to protect pedestrians and reduce injury when they collide or otherwise come in contact with the fire hydrant.
10. The enclosure of claim 1 further comprising, wherein the hollow body when removed for firefighting or maintenance, will not impede with the function of the fire hydrant.
11. The enclosure of claim 1 further comprising, wherein the hollow body may be clear or any color, and may contain lettering and/or graphic designs on an exterior of the hollow body.

* * * * *